United States Patent
Muto et al.

(10) Patent No.: US 8,314,190 B2
(45) Date of Patent: Nov. 20, 2012

(54) RT CURABLE FLUOROPOLYETHER BASE RUBBER COMPOSITION AND CURED PRODUCT

(75) Inventors: Mitsuo Muto, Annaka (JP); Takashi Matsuda, Annaka (JP); Mikio Shiono, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 106 days.

(21) Appl. No.: 12/874,768

(22) Filed: Sep. 2, 2010

(65) Prior Publication Data

US 2011/0060109 A1 Mar. 10, 2011

(30) Foreign Application Priority Data

Sep. 9, 2009 (JP) ................................ 2009-207623

(51) Int. Cl.
C08G 77/00 (2006.01)
C08L 83/00 (2006.01)
(52) U.S. Cl. ........................................ 525/474; 525/476
(58) Field of Classification Search .................. 525/474, 525/476

See application file for complete search history.

(56) References Cited

U.S. PATENT DOCUMENTS

| 6,020,450 | A | 2/2000 | Matsuda et al. |
| 6,441,079 | B2 | 8/2002 | Sato et al. |
| 6,759,467 | B2 | 7/2004 | Sato et al. |

FOREIGN PATENT DOCUMENTS

| EP | 1 033 387 A2 | 9/2000 |
| EP | 1 170 320 A1 | 1/2002 |
| EP | 1 172 415 A1 | 1/2002 |
| EP | 1 354 932 A1 | 10/2003 |
| EP | 1 384 741 A1 | 1/2004 |
| JP | 9-18079 | 1/1997 |
| JP | 9-77944 | 3/1997 |
| JP | 9-137027 | 5/1997 |
| JP | 9-151171 | 6/1997 |
| JP | 9-263639 | 10/1997 |
| JP | 9-263640 | 10/1997 |
| JP | 2000-248166 | 9/2000 |
| JP | 2001-192546 | 7/2001 |
| JP | 2002-20615 | 1/2002 |

OTHER PUBLICATIONS

Extended Search Report issued Nov. 22, 2010 in EP Application No. 10009141.2.

T. Dehelean, "Synthesis of some derivatives of 2-[fluoropoly (hexafluoropropenyloxy)] tetrafluoropropionic acids", Chemical Abstracts Service, Database Caplus [Online], retrieved from STN, Database Accession No. 2002:709747, Sep. 19, 2002, 2 page.

*Primary Examiner* — Ana Woodward
(74) *Attorney, Agent, or Firm* — Oblon, Spivak, McClelland, Maier & Neustadt, L.L.P.

(57) ABSTRACT

A fluoropolyether base rubber composition comprising (a) a linear fluoropolyether compound containing at least two ester groups in a molecule and a divalent perfluoroalkyl ether structure in its backbone, and having a Mn of 3,000-100,000, and (b) a siloxane polymer containing at least three amino groups in a molecule cures at room temperature into a product having heat resistance, low-temperature performance, chemical resistance, solvent resistance and oil resistance.

12 Claims, 3 Drawing Sheets

RT CURABLE FLUOROPOLYETHER BASE RUBBER COMPOSITION AND CURED PRODUCT

CROSS-REFERENCE TO RELATED APPLICATION

This non-provisional application claims priority under 35 U.S.C. §119(a) on Patent Application No. 2009-207623 filed in Japan on Sep. 9, 2009, the entire contents of which are hereby incorporated by reference.

TECHNICAL FIELD

This invention relates to room temperature (RT) curable fluoropolyether base rubber compositions of the amide crosslinking type and cured products thereof. More particularly, it relates to RT curable fluoropolyether base rubber compositions which effectively cure at room temperature into products having improved properties such as heat resistance, low-temperature performance, chemical resistance, solvent resistance and oil resistance.

BACKGROUND ART

Because of a good profile of properties including heat resistance, low-temperature performance, chemical resistance, solvent resistance and oil resistance, heat-curable fluoropolyether base rubber compositions are used in a wide variety of applications, typically in the automotive industry, as disclosed in JP-A 2001-192546, JP-A 2000-248166, and JP-A 2002-020615. Since heat is necessary for these compositions to cure, a problem arises if it is desired to apply the compositions to large-size parts which are too large to place in a heating oven or heat-sensitive parts.

In contrast, RT curable fluoropolyether base rubber compositions of the condensation cure type dispense with heat in forming cured products, and the cured products have improved properties including heat resistance, low-temperature performance, chemical resistance, solvent resistance and oil resistance as disclosed in JP-A H09-077944, JP-A H09-137027, JP-A H09-263639, and JP-A H09-263640. These compositions are expected to find a variety of applications. However, the prior art well-known RT curable fluoropolyether base rubber compositions of the alcohol-removal condensation cure type have some problems. The synthesis route of the base polymer is complex. Since hydrolyzable groups are at both ends of the polymer chain, hydrolysis gradually proceeds with the lapse of time and hence, the base polymer builds up its viscosity. That is, the base polymer has poor storage stability.

JP-A H09-151171 describes an organic fluorine compound having amino groups at both ends which has the advantages of relatively easy synthesis and good storage stability. Although a cured product may be obtained by reacting an organic fluorine compound having amino groups at both ends with a compound having acid fluoride group ((C=O)F) or ester groups at both ends as disclosed therein, the curing rate is as slow as practically unacceptable. There is a desire to have a composition which is effectively curable (or has an appropriate curing rate) at room temperature and offers a cured product having improved properties such as heat resistance, low-temperature performance, chemical resistance, solvent resistance and oil resistance.

CITATION LIST

Patent Document 1: JP-A 2001-192546
Patent Document 2: JP-A 2000-248166
Patent Document 3: JP-A 2002-020615
Patent Document 4: JP-A H09-077944
Patent Document 5: JP-A H09-137027
Patent Document 6: JP-A H09-263639
Patent Document 7: JP-A H09-263640
Patent Document 8: JP-A H09-151171

SUMMARY OF INVENTION

An object of the invention is to provide a RT curable fluoropolyether base rubber composition which is effectively curable at room temperature and offers a cured product having improved properties such as heat resistance, low-temperature performance, chemical resistance, solvent resistance and oil resistance. Another object is to provide a cured product of the composition.

The inventors have found that a fluoropolyether base rubber composition comprising proper amounts of (a) a linear fluoropolyether compound containing at least two ester groups in a molecule and a divalent perfluoroalkyl ether structure in its backbone, and having a number average molecular weight of 3,000 to 100,000, and (b) a siloxane polymer containing at least three amino groups in a molecule is effectively curable at room temperature and offers a cured product having improved properties such as heat resistance, low-temperature performance, chemical resistance, solvent resistance and oil resistance.

Accordingly, the invention provides a room temperature curable fluoropolyether base rubber composition comprising (a) 100 parts by weight of a linear fluoropolyether compound containing at least two ester groups in a molecule and a divalent perfluoroalkyl ether structure in its backbone, and having a number average molecular weight of 3,000 to 100,000, and (b) a siloxane polymer containing at least three amino groups in a molecule in such an amount that a ratio of the total of amino groups in component (b) to the total of ester groups in component (a) may fall in the range between 1.0 and 5.0 on a molar basis.

In a preferred embodiment, the linear fluoropolyether compound (a) has the general formula (1):

ROOC—Rf—COOR'     (1)

wherein Rf is a divalent perfluoroalkyl ether structure, R and R' are each independently a substituted or unsubstituted monovalent hydrocarbon group of 1 to 8 carbon atoms.

Also contemplated herein is a cured product obtained by curing the room temperature curable fluoropolyether base rubber composition.

ADVANTAGEOUS EFFECTS OF INVENTION

The fluoropolyether base rubber composition of the invention is effectively curable at room temperature and offers a cured product having improved properties such as heat resistance, low-temperature performance, chemical resistance, solvent resistance and oil resistance.

DESCRIPTION OF EMBODIMENTS

Figure 1:
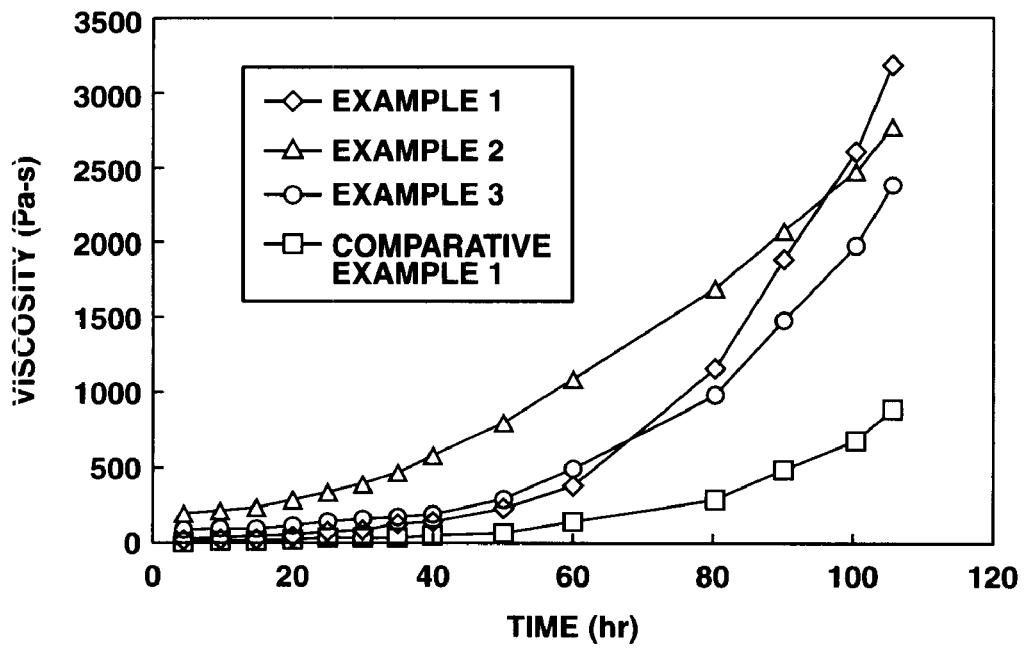
FIG. 1 is a diagram showing curing behaviors at room temperature of the compositions of Examples 1 to 3 and Comparative Example 1.
Figure 2:
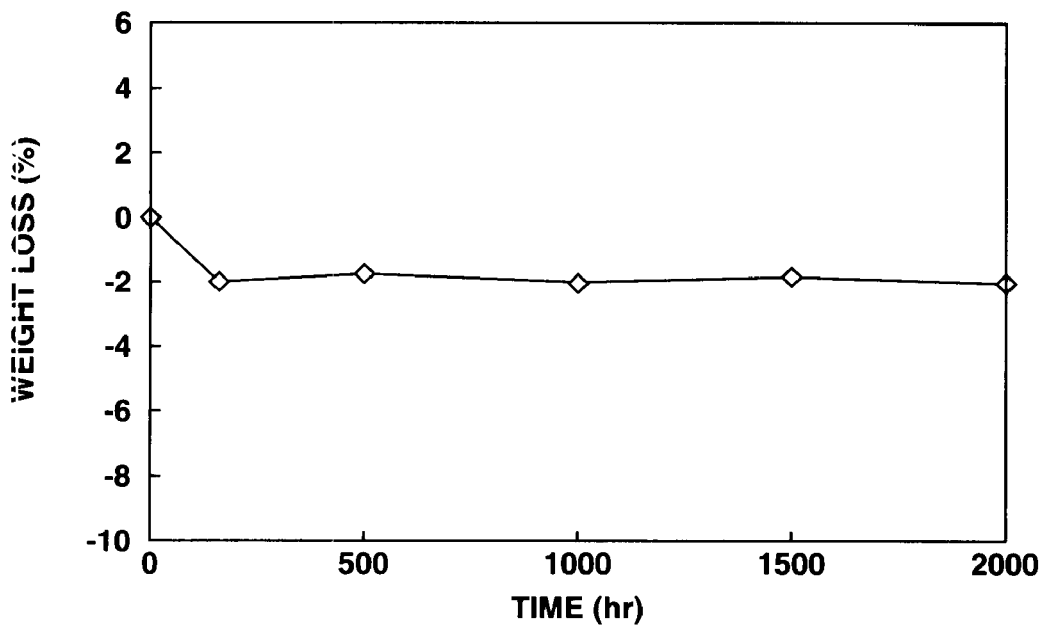
FIG. 2 is a diagram showing a change with time of weight loss of the cured composition of Example 1 as an index of heat resistance.
Figure 3:
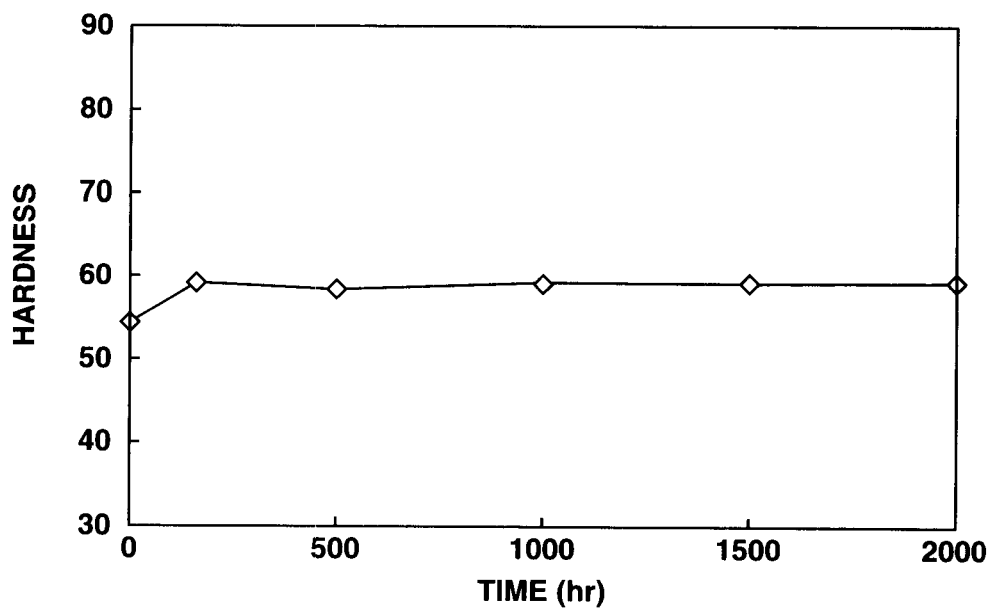
FIG. 3 is a diagram showing a change with time of hardness of the cured composition of Example 1 as an index of heat resistance.
Figure 4:
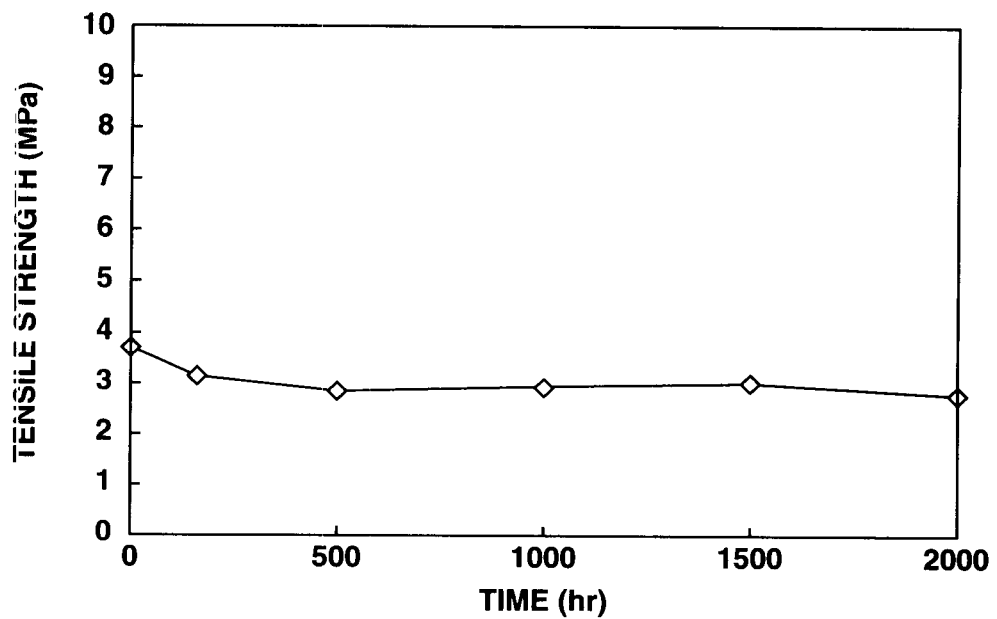
FIG. 4 is a diagram showing a change with time of tensile strength of the cured composition of Example 1 as an index of heat resistance.
Figure 5:
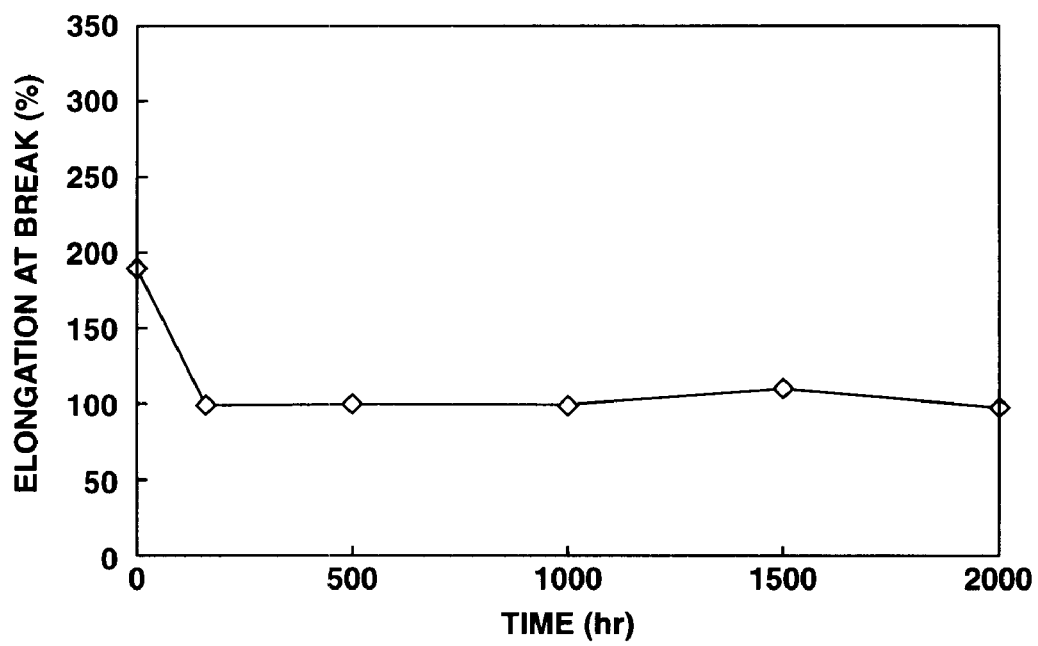
FIG. 5 is a diagram showing a change with time of elongation at break of the cured composition of Example 1 as an index of heat resistance.

Briefly stated, the RT curable fluoropolyether base rubber composition is defined as comprising (a) a linear fluoropolyether compound and (b) an amino-containing siloxane polymer as essential components.

(a) Linear Fluoropolyether Compound

Component (a) is a linear fluoropolyether compound which serves as a base polymer in the composition. The linear fluoropolyether compound should contain at least two ester groups in a molecule and a divalent perfluoroalkyl ether structure in its backbone, and have a number average molecular weight of 3,000 to 100,000.

Typically the linear fluoropolyether compound has the general formula (1):

ROOC—Rf—COOR'     (1)

wherein Rf is a divalent perfluoroalkyl ether structure, R and R' which may be the same or different are a substituted or unsubstituted monovalent hydrocarbon group of 1 to 8 carbon atoms.

Examples of the divalent perfluoroalkyl ether structure include structures of the general formulae (i), (ii), and (iii).

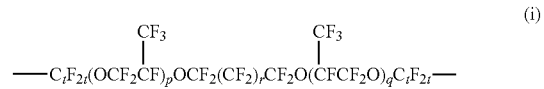

Herein p and q each are an integer of 1 to 150, the sum of p and q is 2 to 200, r is an integer of 0 to 6, and t is 2 or 3.

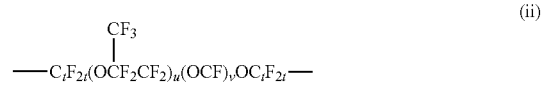

Herein u is an integer of 1 to 200, v is an integer of 1 to 50, and t is 2 or 3.

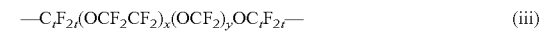

Herein x is an integer of 1 to 200, y is an integer of 1 to 50, and t is 2 or 3.

In formula (1), the optionally substituted monovalent hydrocarbon groups of R and R' are of 1 to 8 carbon atoms, preferably of 1 to 3 carbon atoms. For example, R and R' are preferably selected from methyl, ethyl, n-propyl and isopropyl.

The linear fluoropolyether compound (a) should have a number average molecular weight (Mn) of 3,000 to 100,000, preferably 3,000 to 50,000, as measured by gel permeation chromatography (GPC) versus polystyrene standards. If Mn<3,000, mechanical strength may be poor. If Mn>100,000, working efficiency may be low.

Illustrative examples of the linear fluoropolyether compound of formula (1) are given below.

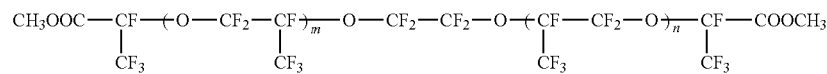

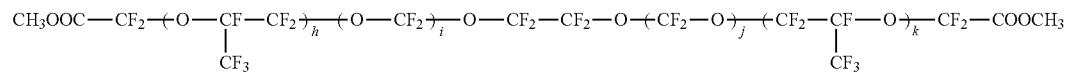

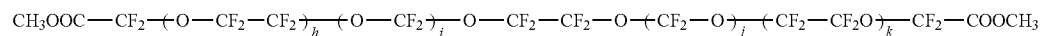

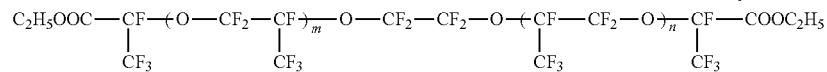

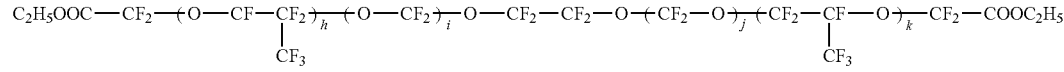

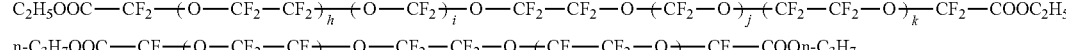

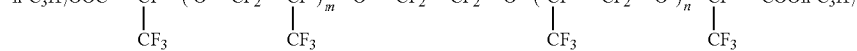

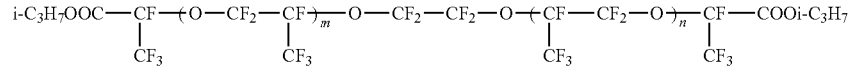

Herein m and n each are an integer of 0 to 600, the sum of m+n is 20 to 600, h, i, j and k are integers satisfying h+i+j+k=20 to 1,000.

(b) Amino-containing Siloxane Polymer

Component (b) is an amino-containing siloxane polymer which serves as a crosslinker and chain extender for component (a). The siloxane polymer is not particularly limited as long as it contains at least three amino groups in a molecule.

If necessary, at least one fluorine-modified group per molecule may be introduced into the siloxane polymer for the purpose of improving the dispersion of the siloxane polymer in component (a). The term "fluorine-modified group" refers to a monovalent perfluoroalkyl group or monovalent perfluoroalkyl ether group, for example, while its molecular structure may be either linear or branched. Typical examples of the fluorine-modified group are groups of the following general formulae, but not limited thereto.

Herein g is an integer of 1 to 6, preferably 4 to 6.

Herein f is an integer of 2 to 200, preferably 2 to 100, and h is an integer of 1 to 3.

Herein d and e each are an integer of 1 to 50.

These perfluoroalkyl and perfluoroalkyl ether groups may take the form of the following ester-terminated compounds when they are introduced into amino-containing siloxane polymers in accordance with the teaching of JP-A H07-18079. Notably, the ester-terminated compounds are not limited to the following.

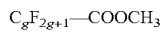

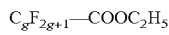

Herein g is an integer of 1 to 6, preferably 4 to 6.

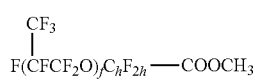

Herein f is an integer of 2 to 200, preferably 2 to 100, and h is an integer of 1 to 3.

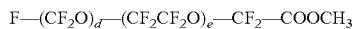

Herein d and e each are an integer of 1 to 50.

In the amino-containing siloxane polymer (b), the amino group is preferably primary amine. The number of amino groups per molecule is not particularly limited although the polymer typically contains 3 to 50, and preferably 3 to 20 amino groups.

Examples of the amino-containing siloxane polymer are given below while they may be used alone or in admixture of two or more.

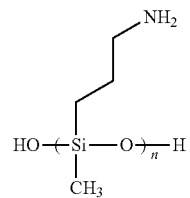

Herein n is an integer of 3 to 50, preferably 3 to 30.

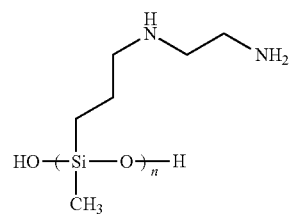

Herein n is an integer of 3 to 50, preferably 3 to 30.

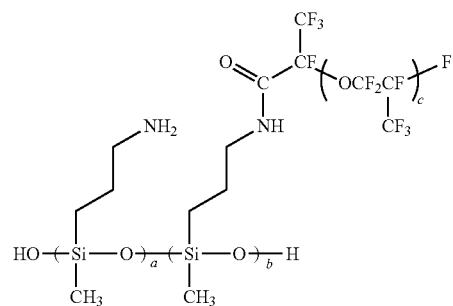

Herein a is an integer of 3 to 50, preferably 3 to 20, b is an integer of 1 to 50, preferably 1 to 10, the sum of a+b is 4 to 100, and c is an integer of 0 to 100, preferably 1 to 30.

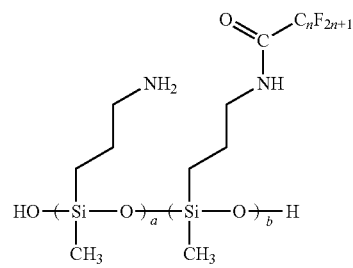

Herein a is an integer of 3 to 50, preferably 3 to 20, b is an integer of 1 to 50, preferably 1 to 10, the sum of a+b is 4 to 100, and n is an integer of 1 to 10, preferably 1 to 6.

The amino-containing siloxane polymer (b) is used in such an amount that a ratio of the total of amino groups in component (b) to the total of ester groups (e.g., methyl ester, ethyl ester or propyl ester groups) in component (a) may fall in the range between 1.0 and 5.0, preferably between 2.0 and 4.0 on a molar basis. If the amino/ester molar ratio is less than 1.0, then a degree of crosslinking may be insufficient and mechanical strength may be low. If the amino/ester molar ratio is more than 5.0, then chain extension may become predominant, leading to under-cure and unsatisfactory cured physical properties. Notably, the amino-containing siloxane polymer as component (b) may be used alone or in admixture of two or more.

Other Components

Insofar as the benefits of the invention are not impaired, various well-known fillers and additives may be added to the inventive composition in addition to the above essential components (a) and (b). Suitable additives include fillers such as fumed silica, crystalline silica, and calcium carbonate, pigments such as iron oxide, cerium oxide and carbon black, colorants, dyes, antioxidants, and viscosity modifiers such as partially or fully fluorine-modified oily compounds.

Use

The fluoropolyether base rubber composition may be obtained in a standard way by intimately mixing components (a) and (b) and optional components. Alternatively, the rubber composition may be formulated to two pack type, that is, components (a) and (b) in separate packs whereupon the two packs are mixed on use.

If desired, the fluoropolyether base rubber composition may be dissolved in or diluted with a solvent prior to use.

Preferred solvents are those in which component (a) is dissolvable, typically fluorinated solvents, for example, $C_4F_{10}$, $C_8F_{18}$, $C_4F_9OCH_3$, $C_4F_9OC_2H_5$, 2-n-nonafluorobutyl-tetrafluorofuran, m-xylene hexafluoride, p-xylene hexafluoride, and benzotrifluoride.

The fluoropolyether base rubber composition will cure into a satisfactory product having minimized surface tack when it is allowed to stand at room temperature (e.g., 5 to 35° C.) for at least 3 days.

Application

The curable fluoropolyether base rubber compositions are effectively curable at room temperature and cure into products having a good profile of properties including heat resistance, low-temperature performance, chemical resistance, solvent resistance and oil resistance. Thus the cured products of the compositions are useful in a wider variety of applications, for example, the application where heat resistance is required, and as large-size parts which are too large to place in a heating oven or heat-sensitive parts.

Specifically, the cured products may be used as rubber parts in automobiles where oil resistance is required, for example, diaphragms, valves, and seal parts; rubber parts in chemical plants, for example, pump diaphragms, valves, hoses, packings, oil seals, gaskets, and tank conduit repairing sealants; rubber parts in inkjet printers; rubber parts in semiconductor manufacturing lines such as diaphragms, valves, packings, gaskets and sealing parts where chemicals come in contact, and valves where low friction and wear resistance are required; rubber parts in analytical and scientific instruments such as pump diaphragms, valves, and sealing parts; rubber parts in medical equipment such as pumps, valves, and joints; tent coating materials, sealants, molded parts, extruded parts, coats, copier roll materials, electrical moisture-proof coating materials, sensor potting materials, fuel cell sealing materials, machine tool sealing materials, laminate rubber fabrics, and the like.

EXAMPLE

Examples of the invention are given below by way of illustration and not by way of limitation. All parts are by weight.

Preparation of Base Compound for RT Curable Composition

To a planetary mixer were fed 100 parts of a polymer of the following formula (2) having a viscosity of 7.8 Pa-s and a number average molecular weight of 15,700 and 10 parts of fumed silica (trade name AEROSIL R972, by Nippon Aerosil Co., Ltd.) as a filler. The mixer was operated for kneading for 1 hour. The mixture was mixed and heat treated for 1 hour at 150° C. and a reduced pressure of −65 to −75 cmHg, cooled, and dispersion treated on a three-roll mill, obtaining a base compound.

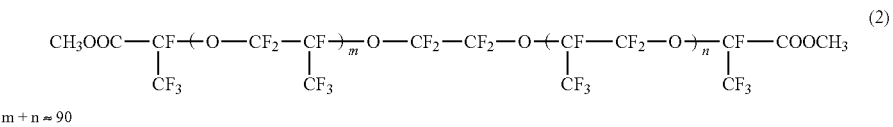

(2)

$m + n \approx 90$

Preparation of RT Curable Composition

Example 1

To 110 parts of the base compound, 11.2 parts of a fluorine-modified amino group-containing siloxane polymer having the following formula (3) was added so as to give an amino group/methyl ester group ratio of 3.0 on a molar basis. The ingredients were uniformly mixed to yield a curable fluoropolyether base rubber composition.

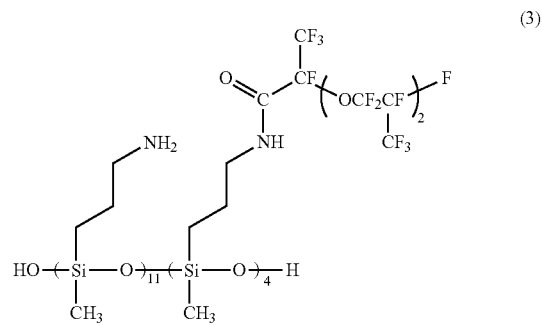

(3)

Example 2

To 110 parts of the base compound, 11.7 parts of a fluorine-modified amino group-containing siloxane polymer having the following formula (4) was added so as to give an amino group/methyl ester group ratio of 3.0 on a molar basis. The ingredients were uniformly mixed to yield a curable fluoropolyether base rubber composition.

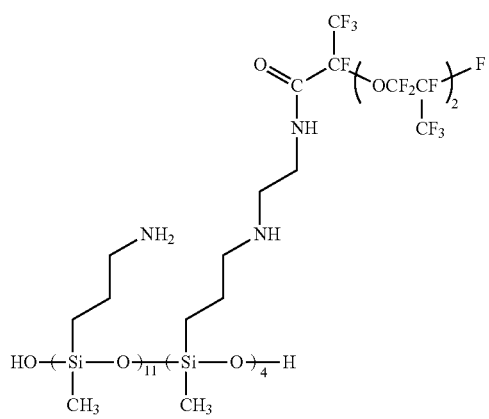

(4)

Example 3

To 110 parts of the base compound, 9.6 parts of a fluorine-modified amino group-containing siloxane polymer having the following formula (5) was added so as to give an amino group/methyl ester group ratio of 3.0 on a molar basis. The ingredients were uniformly mixed to yield a curable fluoropolyether base rubber composition.

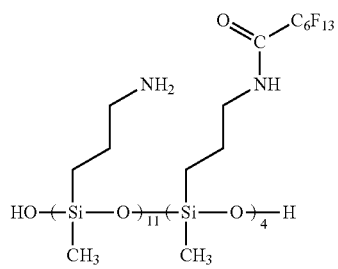

(5)

Comparative Example 1

To 110 parts of the base compound, 57.1 parts of a fluorine-modified polyfunctional amine compound having the following formula (6) as disclosed in JP-A H09-151171 was added so as to give an amino group/methyl ester group ratio of 3.0 on a molar basis. The ingredients were uniformly mixed to yield a curable fluoropolyether base rubber composition.

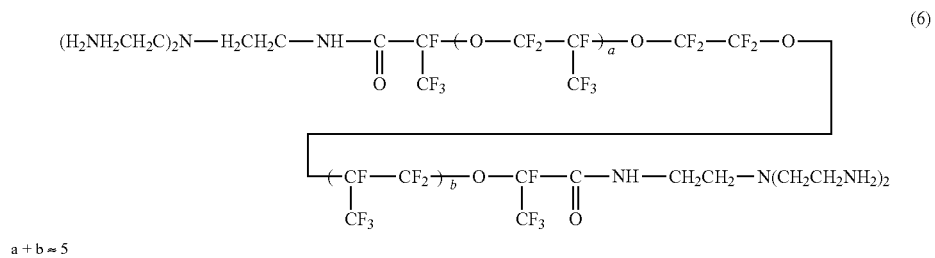

(6)

a + b ≈ 5

Evaluation of RT Cure

The compositions of Examples 1 to 3 and Comparative Example 1 were estimated for curability by monitoring the viscosity at room temperature (23.5° C.) to confirm a change of viscosity with time. Viscosity measurement was according to JIS K7117. The results are shown in FIG. 1.

As seen from FIG. 1, the compositions using the amino-containing siloxane polymers in Examples 1 to 3 as a crosslinking agent show an abrupt viscosity buildup with the lapse of time. It is thus demonstrated that fluoropolyether base rubber compositions which are effectively curable are obtained using the amino-containing siloxane polymers in Examples 1 to 3 as a crosslinking agent.

Evaluation of Physical Properties of Cured Product

The compositions of Examples 1 to 3 and Comparative Example 1 were cast into a mold of 2 mm deep and allowed to stand at room temperature (23.5° C.) for one week, obtaining cured product samples. The samples were measured for rubber physical properties according to JIS K6250, 6251, and 6253. The results are shown in Table 1.

TABLE 1

| Rubber physical properties | Example 1 | Example 2 | Example 3 | Comparative Example 1 |
|---|---|---|---|---|
| Hardness (Type A durometer) | 56 | 53 | 57 | not cured |
| Tensile strength (MPa) | 2.9 | 2.8 | 2.5 | |
| Elongation at break (%) | 160 | 180 | 150 | |
| Density (g/cm$^3$) | 1.86 | 1.86 | 1.87 | |

As seen from the test results in Table 1, the cured products of Examples 1 to 3 have satisfactory rubber physical properties.

Evaluation of Heat Resistance of Cured Product

The cured product obtained from the composition of Example 1 was examined for heat loss, hardness, tensile strength and elongation at break during a test of heating at 150° C. according to JIS K6257. The results are shown in FIGS. 2 to 5.

As seen from the test results in FIGS. 2 to 5, the cured product obtained from the composition of Example 1 shows a weight loss, a hardness increase, a lowering of tensile strength, and a lowering of elongation at break at the initial stage (168 hr) of heating during which crosslinking reaction is promoted. Thereafter, however, it shows a stable transition of physical property values. These facts prove that the cured product obtained from the composition of Example 1 has excellent heat resistance at 150° C.

For Examples 2 and 3, similar results were obtained from the same test. It is thus proven that the compositions of Examples 2 and 3 have excellent heat resistance at 150° C.

Evaluation of Low-Temperature Performance of Cured Product

Using a differential scanning calorimeter (DSC), the glass transition temperature (Tg) of the cured product obtained from the composition of Example 1 was analyzed to find Tg=−54° C. This proves that the cured product obtained from the composition of Example 1 has excellent low-temperature performance.

For Examples 2 and 3, the cured products were similarly analyzed to find Tg=−53° C. and −54° C., respectively. This proves that the cured products obtained from the compositions of Examples 2 and 3 have excellent low-temperature performance.

Evaluation of Solvent Resistance of Cured Product

The cured product obtained from the composition of Example 1 was examined by an immersion test in various organic solvents according to JIS K6258. A percent volume change was measured to evaluate solvent swell resistance. The results are shown in Table 2.

TABLE 2

| Solvent | Volume change (%) |
|---|---|
| Fuel C | 5 |
| Hexane | 5 |
| Toluene | 3 |
| Chloroform | 15 |
| MEK | 16 |
| Ethyl acetate | 10 |
| Methanol | 9 |
| Ethylene glycol | 0 |
| THF | 14 |

As seen from the test results in Table 2, the cured product obtained from the composition of Example 1 has improved solvent swell resistance.

For Examples 2 and 3, similar results were obtained from the same test. It is thus proven that the compositions of Examples 2 and 3 have improved solvent swell resistance.

Japanese Patent Application No. 2009-207623 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A room temperature curable fluoropolyether base rubber composition comprising
   (a) 100 parts by weight of a linear fluoropolyether compound comprising at least two ester groups and a backbone comprising a divalent perfluoroalkyl ether structure, wherein said linear fluoropolyether compound has a number average molecular weight of 3,000 to 100,000, and
   (b) a siloxane polymer comprising at least three amino groups in such an amount that the ratio of the total of amino groups in component (b) to the total of ester groups in component (a) is in the range between 1.0 and 5.0 on a molar basis.

2. The composition of claim 1 wherein the siloxane polymer (b) is one selected from the group consisting of polymers represented by formulae (iv) to (vii):

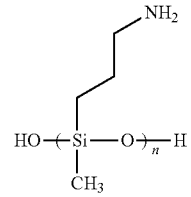
(iv)

wherein n is an integer of 3 to 50,

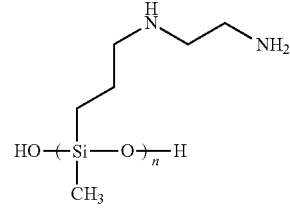
(v)

wherein n is an integer of 3 to 50,

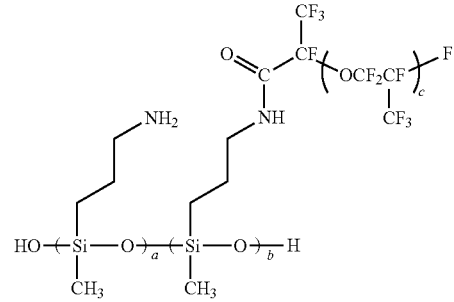
(vi)

wherein a is an integer of 3 to 50, b is an integer of 1 to 50, the sum of a+b is 4 to 100, and c is an integer of 0 to 100, and

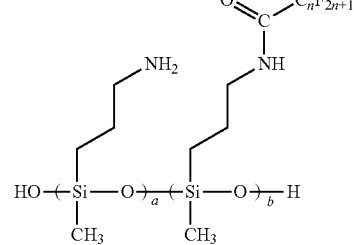
(vii)

wherein a is an integer of 3 to 50, b is an integer of 1 to 50, the sum of a+b is 4 to 100, and n is an integer of 1 to 10.

3. The composition of claim 1 wherein the linear fluoropolyether compound (a) is represented by formula (1):

$$ROOC—Rf—COOR'  \quad (1)$$

wherein Rf is a divalent perfluoroalkyl ether structure, R and R' are each independently a substituted or unsubstituted monovalent hydrocarbon group of 1 to 8 carbon atoms.

4. The composition of claim 3 wherein Rf is one selected from the group consisting of divalent perfluoroalkyl ether groups represented by formulae (i) to (iii):

(i)

wherein p and q each are an integer of 1 to 150, the sum of p and q is 2 to 200, r is an integer of 0 to 6, and t is 2 or 3,

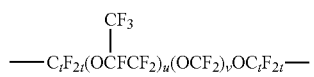

(ii)

wherein u is an integer of 1 to 200, v is an integer of 1 to 50, and t is 2 or 3, and —$C_tF_{2t}(OCF_2CF_2)_x(OCF_2)_yOC_tF_{2t}$— (iii)

wherein x is an integer of 1 to 200, y is an integer of 1 to 50, and t is 2 or 3.

5. The composition of claim 3 wherein Rf is a divalent perfluoroalkyl ether groups represented by formulae (i):

(i)

wherein p and q each are an integer of 1 to 150, the sum of p and q is 2 to 200, r is an integer of 0 to 6, and t is 2 or 3.

6. The composition of claim 3 wherein Rf is a divalent perfluoroalkyl ether groups represented by formulae (ii):

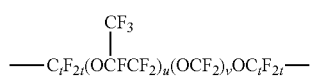

(ii)

wherein u is an integer of 1 to 200, v is an integer of 1 to 50, and t is 2 or 3.

7. The composition of claim 3 wherein Rf is a divalent perfluoroalkyl ether groups represented by formulae (iii):

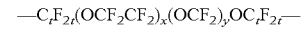

(iii)

wherein x is an integer of 1 to 200, y is an integer of 1 to 50, and t is 2 or 3.

8. A cured product obtained by curing the room temperature curable fluoropolyether base rubber composition of claim 1.

9. The composition of claim 1 wherein the siloxane polymer (b) is a polymer represented by formulae (iv):

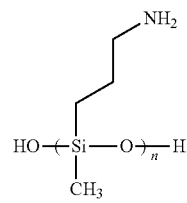

(iv)

wherein n is an integer of 3 to 50.

10. The composition of claim 1 wherein the siloxane polymer (b) is a polymer represented by formulae (v):

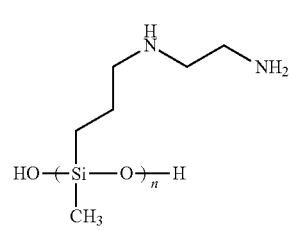

(v)

wherein n is an integer of 3 to 50.

11. The composition of claim 1 wherein the siloxane polymer (b) is a polymer represented by formulae (vi):

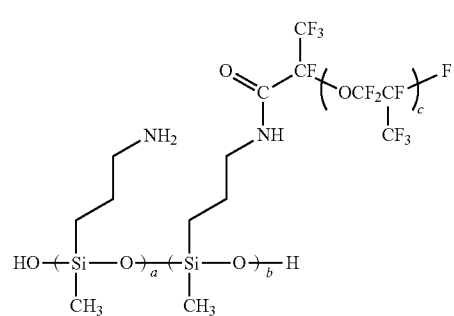

(vi)

wherein a is an integer of 3 to 50, b is an integer of 1 to 50, the sum of a+b is 4 to 100, and c is an integer of 0 to 100.

12. The composition of claim 1 wherein the siloxane polymer (b) is a polymer represented by formulae (vii):

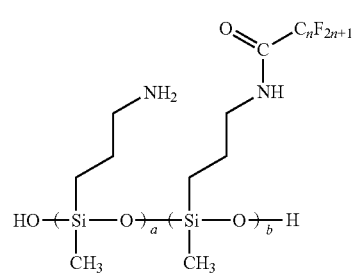

(vii)

wherein a is an integer of 3 to 50, b is an integer of 1 to 50, the sum of a+b is 4 to 100, and n is an integer of 1 to 10.

* * * * *